United States Patent [19]

Church et al.

[11] Patent Number: 5,268,948
[45] Date of Patent: Dec. 7, 1993

[54] LOCKING ASSEMBLY FOR NUCLEAR FUEL BUNDLES

[75] Inventors: Kenneth D. Church, Huntersville; Michael R. Austin, Charlotte, both of N.C.

[73] Assignee: Duke Power Company, Charlotte, N.C.

[21] Appl. No.: 903,911

[22] Filed: Jun. 25, 1992

[51] Int. Cl.⁵ .................................................. G21C 3/30
[52] U.S. Cl. ...................................... 376/446; 376/449
[58] Field of Search ................. 376/446, 440, 449, 364

[56] References Cited

U.S. PATENT DOCUMENTS

| | | | |
|---|---|---|---|
| 3,864,211 | 2/1975 | King et al. | 376/446 |
| 3,953,287 | 4/1976 | Long et al. | 376/440 |
| 4,064,004 | 12/1977 | Long et al. | 376/440 |
| 4,219,386 | 8/1980 | Osborne et al. | 376/446 |
| 4,452,755 | 6/1984 | Hylton | 376/446 |

Primary Examiner—Daniel D. Wasil
Attorney, Agent, or Firm—Shefte, Pinckney & Sawyer

[57] ABSTRACT

The present invention provides a locking assembly for locking in place an upper support plate above a nuclear fuel bundle. The locking assembly includes several different components, including one rotatable member that is movable between a first position for locking the support plate in place and an unlocked position for releasing the support plate so that it can be removed from the guide tubes in the fuel bundle assembly. The rotatable member is resiliently maintained at its locked and released positions, and the entire locking assembly is an integral unit without any loose parts regardless of the position of the rotatable member.

19 Claims, 8 Drawing Sheets

LOCKING ASSEMBLY FOR NUCLEAR FUEL BUNDLES

BACKGROUND OF THE INVENTION

The present invention relates generally to a locking assembly used in conjunction with nuclear reactors to normally lock in place an upper support plate disposed at the top of a fuel bundle, and to selectively permit the easy removal of such support plate when it is necessary or desirable to remove one or more of the fuel rods in the fuel bundle.

There are several types of nuclear reactors used to generate power, one of which is the pressurized water reactor (PWR). In a PWR the reactor core contains an array of fuel bundles or assemblies comprised of fuel rods containing uranium.

PWR units in the United States generally operate for approximately 12 to 18 months after which the plant is routinely shut down for refueling so that all systems and components can be checked to ensure safety and reliability. Occasionally, fuel will fail during the 12 to 18 months of power operation. Fuel is considered failed when a fuel rod wall is breached and radioactive isotopes are released into the water which cools the fuel during power operation. Failure can result in a number of ways, such as debris in the cooling water fretting the fuel rod in a localized area, or flaws introduced during fuel fabrication.

In the past, a small percentage of failed fuel was acceptable, but, recently, emphasis has been placed on eliminating the continued operation of any known failed fuel. When fuel fails, radioactive isotopes are released into the coolant water and should the level of these radioactive isotopes indicate that there is failed fuel, such failed fuel should be promptly removed.

Rather than remove an entire fuel assembly from further operation, a more economical solution is to replace only the failed fuel rods with structurally sound replacement rods and return the assembly back to operation. The fuel rods are replaced by disconnecting an upper support plate or upper end fitting from guide tubes forming part of the fuel assembly, thereby allowing the fuel rods to be removed. The replacement or removal of failed fuel rods occurs during the outage when time to perform such work is limited, and, therefore, a need exists for fuel assembly features which allow replacement to be performed as quickly as possible. Early fuel assembly designs did not provide a means for replacement since some failed fuel was acceptable. However, as emphasis was placed on removal of failed fuel, designs were developed to allow replacement.

For example, Long et al U.S. Pat. No. 4,064,004 discloses an assembly mechanism which permits the upper support plate to be removed from guide tubes and which includes a pair of cooperating movable members, one of which is operable to be moved to one position at which the upper support plate is normally maintained in place on the guide tubes by lugs, and to be selectively rotated to a second position at which a slot formed in the support plate can be aligned with such lugs to permit removal of the support plate. The other movable member is axially movable and is urged by a coil spring to a normal position at which it prevents the rotatable member from being moved to its aligned position with respect to the support plate slot. In this system, the cooperating locking members are locked together at the support plate release position but they are not locked to the guide tube after the support plate is removed. Therefore, there is no assurance that the locked members will remain at the same orientation relative to the guide tube after the support plate is removed, and they are free to move to a different position on the guide tube which will require that all of the locked members be carefully aligned with the slots on the support plate when the support plate is repositioned on the ends of the guide tubes.

In accordance with the present invention, a simplified locking assembly is provided which overcomes the aforesaid drawback of known locking mechanisms, and which provides an arrangement that is easy to operate while providing a secure lock for the upper support plate.

SUMMARY OF THE INVENTION

Briefly summarized, the present invention provides a locking assembly for permitting the easy removal of fuel rods from a nuclear power reactor fuel bundle and this locking assembly includes a plurality of control rod guide tubes extending upwardly from the fuel bundle, and a support plate that is removably mounted on the guide tubes to permit removal of the fuel rods when the support plate is removed from the guide tubes, this support plate being formed with openings for receiving the extending ends of each of the guide tubes and being formed with a slot extending outwardly from each such opening. A collar assembly is mounted at the extending end of each guide tube for permitting selective removal of the support plate from the guide tubes, and this collar assembly includes a base portion and first and second locking portions mounted on the base portion for movement relative to one another, and one of the locking portions is formed with lugs or projections that correspond generally in shape to the aforesaid slot in the support plate, and one of the locking portions is arranged for movement between a first position at which the aforesaid projection is openly aligned with the slot in the support plate to permit removal of the support plate, and a second position at which the projection is not openly aligned with the slot whereby the plate is locked in place on the guide tubes.

A resilient member is associated with the collar assembly for resiliently locking the movable locking portion against movement with sufficient force to maintain it at its second locking position, and for selectively releasing the movable locking portion when a predetermined torsional force is applied to the movable locking portion to thereby permit movement of the movable locking portion to its first aligned position at which the support plate can be removed from the guide tubes. Preferably, the resilient means resiliently locks the movable locking portion against movement by resiliently engaging an annular engagement surface on the second locking portion, and the resilient element is capable of locking the movable locking portion in place at both its first aligned or removal position and at its second locking position.

In one embodiment of the present invention, the movable locking portion is arranged for rotational movement with respect to the base portion, and it is formed with a body portion and a slot therein which corresponds in shape to the slot in the support plate. A second locking portion is fixed to the base portion and includes a projection extending outwardly therefrom, and the rotatable locking portion is disposed intermediate this projection and the support plate and is rotatable between a first position at which the slot therein is openly aligned with the slot in the support plate to permit the support plate to pass over the projection for removal, and a second position at which the slot in the movable locking portion is out of alignment with the slot in the support plate and the body portion of the movable locking portion is disposed between the projection and the support plate to block removal of the support plate over such projection. Preferably, the rotatable locking portion includes an exterior annular engagement surface, and the resilient element resiliently engages the annular engagement surface by presenting a spring biased ear that is resiliently engaged at either one of two detents formed in the annular engagement surface.

In a second embodiment of the present invention, the movable locking portion is rotatably mounted on the base portion and is formed with a projection that corresponds generally in shape to the support plate slot, and a retaining member is fixed to the guide tube for maintaining the movable locking portion in place on the base portion and permitting it to move between its first and second positions, and, preferably, the fixed element includes an exterior annular wall portion disposed within an adjacent interior annular wall portion on the movable portion, and the fixed element includes at least one, and preferably two, detents formed in the exterior annular wall portion, and a spring biased ear is formed at the interior annular wall of the movable locking portion.

In a third embodiment, the collar assembly includes a base portion and a locking portion that is rotatably mounted on the base portion and formed with a projection corresponding generally in shape to the slot in the support plate, and this locking portion is rotatable between first and second positions for releasing and locking in place the support plate, respectively. In this embodiment, the resilient element includes a spring biased element disposed within and adjacent an interior annular engagement surface on the rotatable locking portion, and movable therewith, for resiliently engaging a fixed element on the base with a sufficient force to normally maintain the locking portion at its first position and for releasing the locking portion when a predetermined torsional force is applied thereto. Preferably, the annular engagement surface of the movable locking portion has an inwardly extending protrusion, and the spring biased element is a snap ring positioned within, and movable with the movable locking portion and formed with a spring biased ear for resiliently engaging the fixed element.

DETAILED DESCRIPTION OF THE PREFERRED EMBODIMENTS

Figure 1:
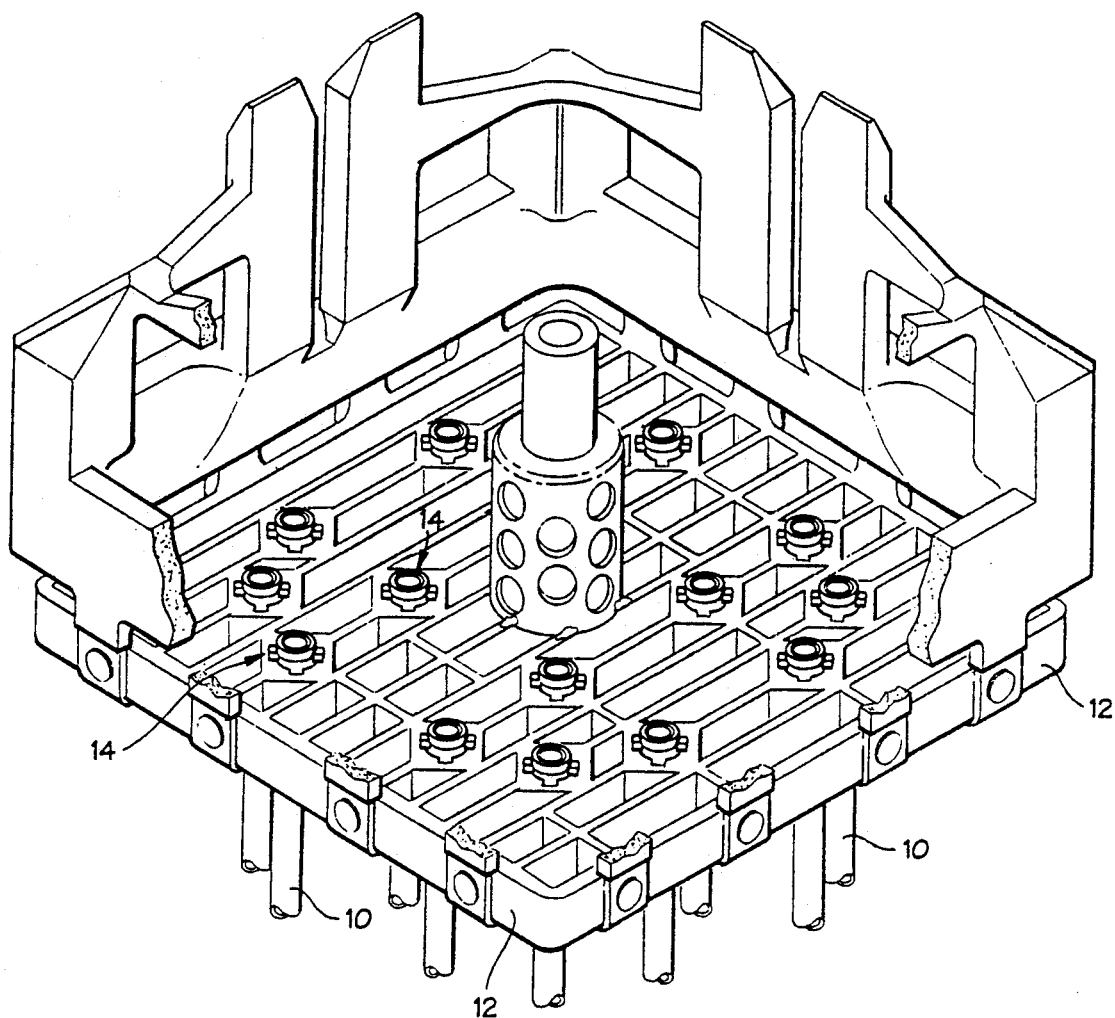
FIG. 1 is a perspective view illustrating the upper end of a typical assembled nuclear fuel bundle that utilizes locking assemblies according to the present invention.

Looking now in greater detail at the accompanying drawings, FIG. 1 is a perspective view illustrating the upper end of a typical assembly for a nuclear fuel bundle of the general type that is described in greater detail in the aforementioned U.S. Pat. No. 4,064,004. The details of the fuel bundle itself are not important to the present invention, except to note that a typical fuel bundle includes a plurality of vertically extending control rod guide tubes 10, the lower ends of which are secured to a lower support plate or tie plate (not shown) and the upper ends of which are received within an upper end fitting or upper support plate 12. As explained above, it is necessary from time to time to remove the fuel rods (not shown) which normally extend vertically at a position beneath the upper support plate 12, and these fuel rods are removed by first disconnecting, and then removing, the upper support plate 12 from its mounting on the upper ends of the guide tubes 10. The present invention relates to a locking assembly, which is generally indicated by the reference numeral 14 in FIG. 1, that normally locks the upper support plate 12 in position on the guide tubes 10, but which can be easily manipulated to unlock or disconnect the upper support plate 12 from the guide tubes 10 for removal therefrom.

Figure 2:
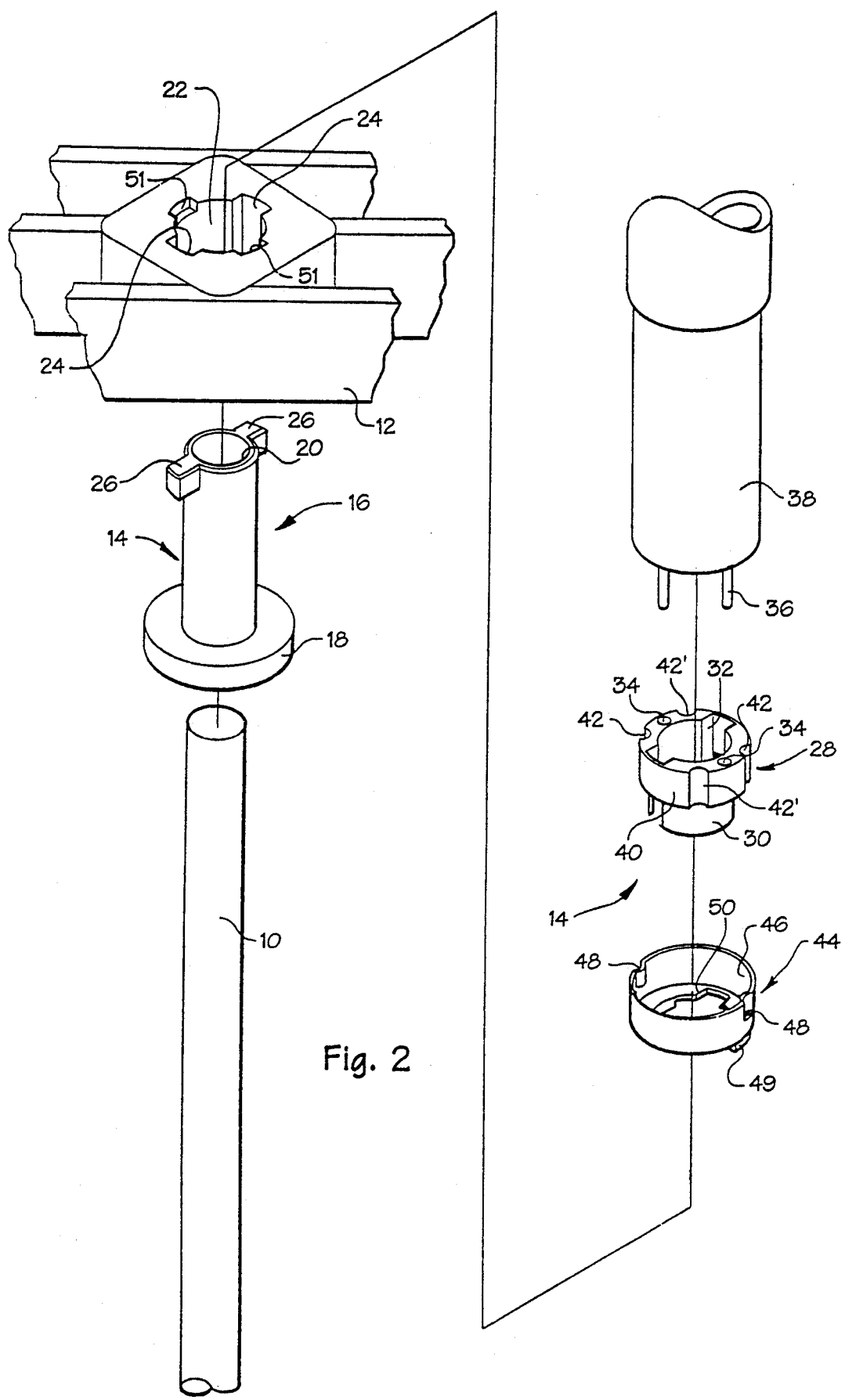
FIG. 2 is an exploded view showing the various components of a first embodiment of the locking assembly of the present invention.
Figure 3:
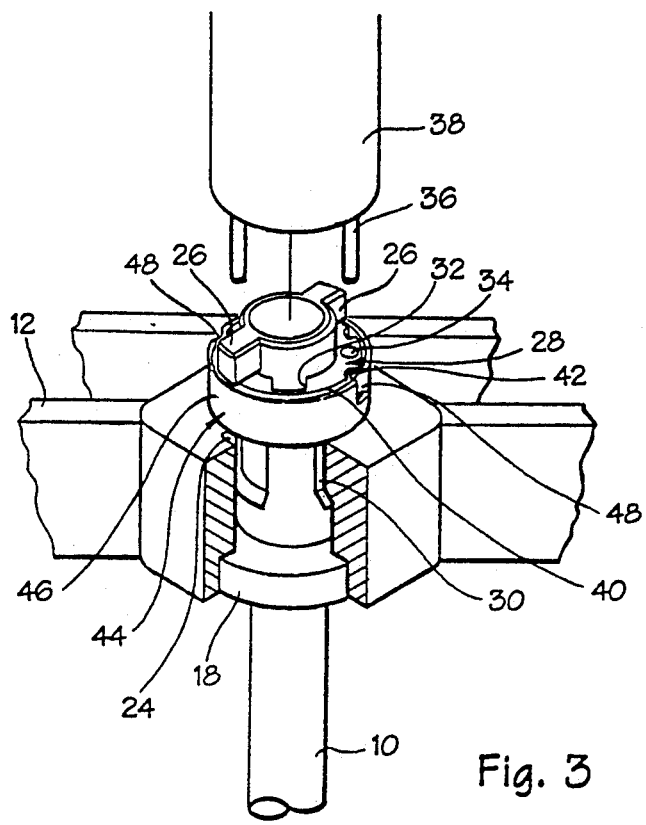
FIG. 3 is a perspective view, partially in section, showing the movable locking portion at its locked position.
Figure 4:
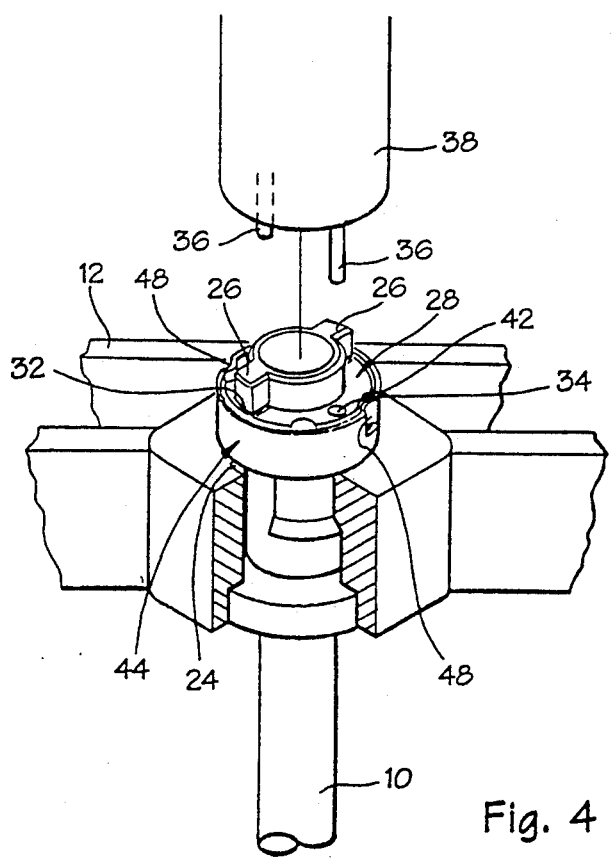
FIG. 4 is a perspective view similar to FIG. 3, but showing the movable locking portion at its aligned or unlocked position.
Figure 5:
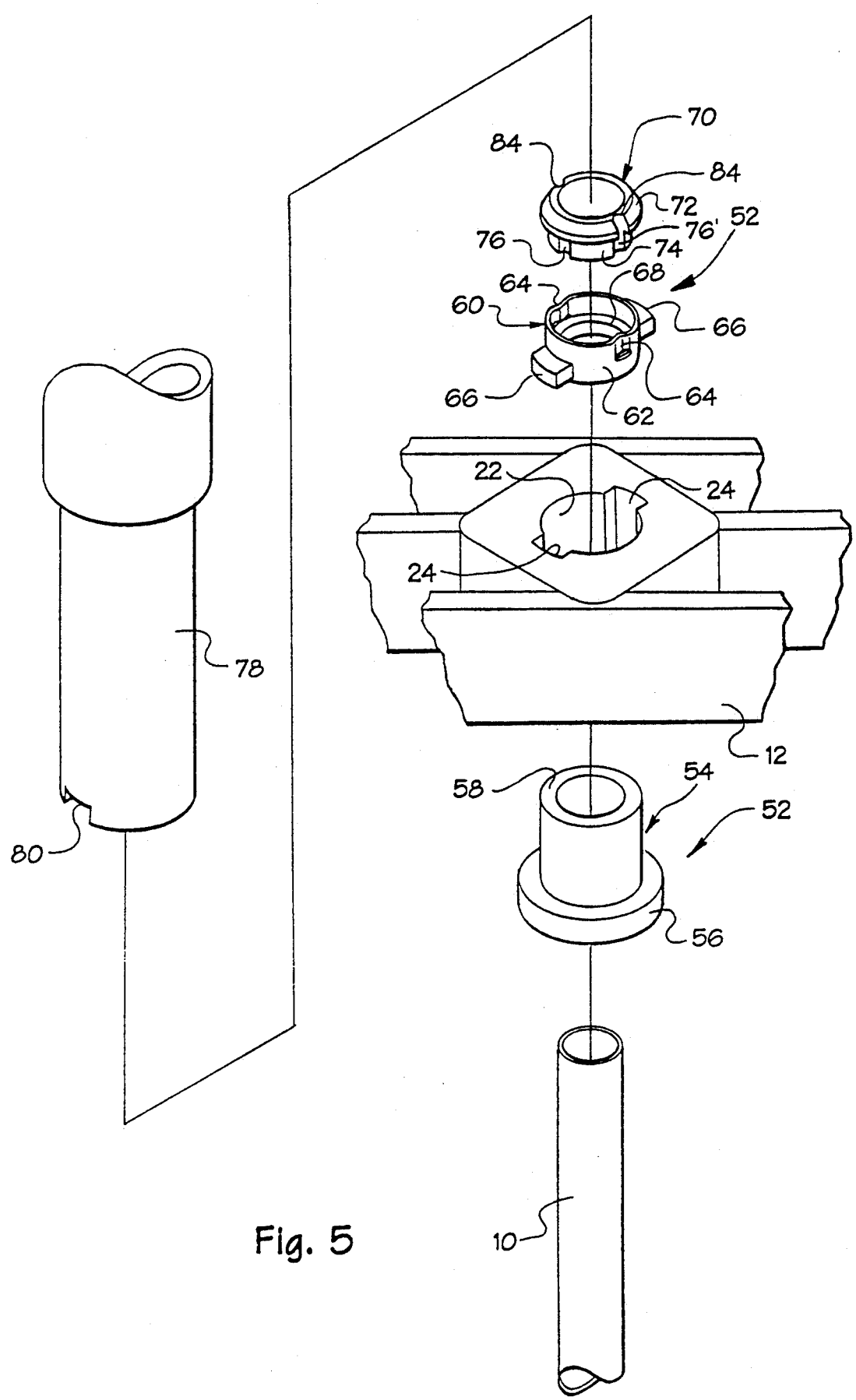
FIG. 5 is an exploded view showing the various components of a second embodiment of the present invention.

One embodiment of the locking assembly 14 of the present invention is illustrated in FIGS. 2-4 and includes a collar 16 that is fixed to the upper end of each guide tube 10, the collar including a radially extending shoulder 18 that normally is received within a recess at the bottom surface of the support plate 12 as best seen in FIGS. 3 and 4, whereby the support plate 12 is supported on the upper ends of the shoulders 18 of each collar 16 in the fuel bundle. The collar 16 also includes a sleeve 20 that extends axially up through a cylindrical opening 22 in the support plate 12, the opening 22 also being provided with a generally rectangular slot 24 extending radially outwardly in opposite directions from the opening 22.

The upper end of the sleeve 20 is provided with two oppositely extending projections 26 which correspond generally in shape to the slots 24 in the support plate 12. A generally annularly shaped locking member 28 is rotatably mounted on the sleeve 20, and is provided with depending feet 30 which are flared outwardly at the lower ends thereof for engaging an interior annular surface of the support plate opening 22 (see FIGS. 3 and 4), whereby the locking member 28 is freely rotatable within the opening 22 but is restrained from any axial movement relative to the support plate 12. The locking member 28 is provided with a transversely extending slot 32, the outer ends of which correspond generally in shape to the support plate slots 24, and the upper surface of the locking member 28 is provided with two apertures 34 for receiving the prongs 36 of a operating tool 38 for a purpose to be described in greater detail presently. The annular body portion of the locking member 28 presents an exterior annular surface 40 that is formed with two pairs of oppositely disposed detents 42 and 42' which are preferably arranged in circumferentially spaced relationship to one another, as best seen in FIG. 2.

A locking cup 44 is provided which consists of a relatively thin annular wall portion 46 formed of a suitable metal, and being provided with a pair of oppositely disposed spring biased ears 48. The locking cup 44 is also provided with a generally flat lower wall portion 50 having an opening therein for receiving the sleeve 20, and the locking cup 44 is provided with oppositely disposed depending tabs 49, only one of which is visible in FIG. 2, which are received within recesses 51 (see FIG. 2) in the support plate opening 22 to anchor the locking cup 44 against rotational movement. As best seen in FIGS. 3 and 4, the rotatable locking member 28 is received within the confines of the annular wall 46 of the locking cup 44, with the exterior annular surface 40 of the locking member 28 closely adjacent the interior surface of the locking cup annular wall 46, and with the bottom wall 50 of the locking cup 44 contained between the body portion of the locking member 28 and the upper surface of the support plate 12. Since, as described above, the locking member 28 is retained on the support plate 12 by the depending feet 30, the locking cup 44 is likewise maintained as an integral part of the operating unit by virtue of the bottom wall 50 being positioned between the locking member 28 and the support plate 12.

In operation, the collar 16 is welded or otherwise fixed to the upper end of the guide tubes 10 and is disposed with the radially extending projections 26 aligned with the slots 24 in the support plate 12, and the rotatable locking member 28 is normally at its locking position illustrated in FIG. 3, at which position the locking member slot 32 is out of alignment with the projections 26 and the support plate slots 24, and the body portion of the locking member 28 is positioned between the projections 26 and the slots 24 to lock the support plate 12 in place on the guide tubes 10. At this locking position, the spring biased ears 48 in the locking cup 44 are deflected inwardly and positively engage one pair of detents 42 to resiliently maintain the locking member 28 against rotation.

When it is desired to remove the support plate 12 from the guide tubes 10 for purposes described above, the tool 38 is manipulated to insert the prongs 36 thereof in the apertures 34 of the locking member 28, and the tool 38 is then rotated to impose a predetermined torsional force on the locking member 28 which results in the spring biased ears 48 being deflected outwardly by the camming action of the moving detents 42, whereby the locking member 28 is easily rotatable about the sleeve 20 until the second pair of detents 42' are positioned adjacent the spring biased ears 48, which then deflect inwardly to engage the detents 42' and resiliently maintain the rotatable locking member 28 at its unlocked or release position with the slot 32 therein aligned with both the projections 26 and the support plate slots 24.

It will be apparent that this procedure for rotating the locking member 28 is quick and simple, and when all of the locking members 28 for each of the locking assemblies 14 associated with the support plate 12 have been rotated to their unlocked positions, the support plate 12 can be easily removed from the upper ends of the guide tubes 10 by lifting it upwardly so that the projections 26 can pass through the openly aligned slots 24 and 32. It will also be apparent that after the support plate 12 has been removed from the guide tubes 10, the locking assembly 14 remains integrally fixed to the support plate 12 and guide tubes 10 so that there are no loose parts which must be kept track of, and the rotatable locking member 28 is resiliently and positively maintained at its unlocked position by virtue of the spring biased ears 48 engaging the detents 42', so that when the support plate 12 is again to be positioned on the guide tubes 10, the locking member 28 of each of the locking assemblies 14 will be properly positioned to permit passage of the projections 26 through the aligned slots 24 and 32, all without any manipulation or adjustment of the various locking assemblies 14. Moreover, once the support plate 12 is properly positioned on the guide tubes 10, it is again a relatively simple matter to manipulate the tool 38 so that the prongs 36 engage the apertures 34, whereupon the locking member can be rotated back to its locked position with the spring biased ears again engaging the detents 42.

A second embodiment of the present invention is illustrated in FIGS. 5-8, and it consists of a locking assembly 52 that includes a collar 54 having a radially extending shoulder 56 that supports the support plate 12 in the same manner as that described above, and a cylindrical sleeve portion 58 that is welded or otherwise secured at the upper end of the guide tube 10, the sleeve portion extending up through the opening 22 in the support plate 12 so as to be coextensive therewith. A rotatable locking member 60 includes an annular wall portion 62 formed of suitable metal, and has a pair of oppositely disposed spring biased ears 64 that are deflected inwardly from the interior surface of the annular wall portion 62. A pair of projections 66 extend outwardly from the annular wall portion, and they have a shape corresponding generally to that of the support plate slots 24. The rotatable locking member 60 also includes a flat bottom surface 68 that is slidably mounted between the top surface of the sleeve 58 and an end portion 70 that is welded or otherwise secured at the upper end of the guide tube 10 whereby the rotatable locking member 60 is axially contained between the sleeve 58 and the fixed end portion 70, while still being freely rotatable about the guide tube 10. The end portion 70 is provided with an outwardly extending shoulder 72, and a depending annular portion 74 that extends within the confines of the annular wall 62, the exterior surface of the annular portion 74 being formed with two pairs of opposed detents 76,76', only one detent in each pair being visible in FIG. 5.

Figure 6:
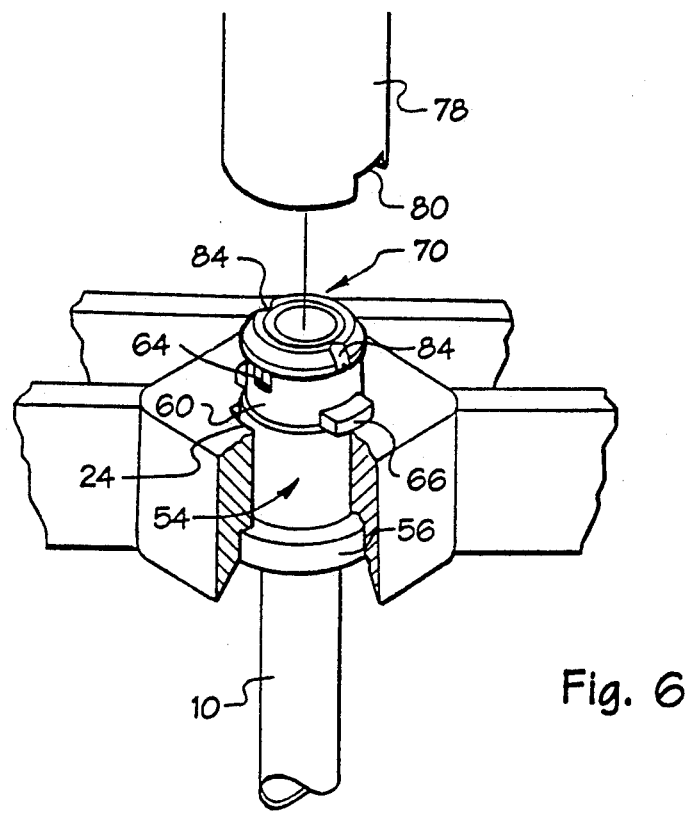
FIG. 6 is a perspective view, partially in section, showing the movable locking portion at its locked position.

In operation, the rotatable locking member 60 is normally positioned as shown in FIG. 6 with the projections 66 thereof engaging the upper surface of the support plate 12 and maintaining it in a locked position between such projections and the shoulder 56. At this locked position, the spring biased ears 64 resiliently engage one pair of detents 76 to resiliently maintain the rotatable locking portion 60 at its locked position.

Figure 7:
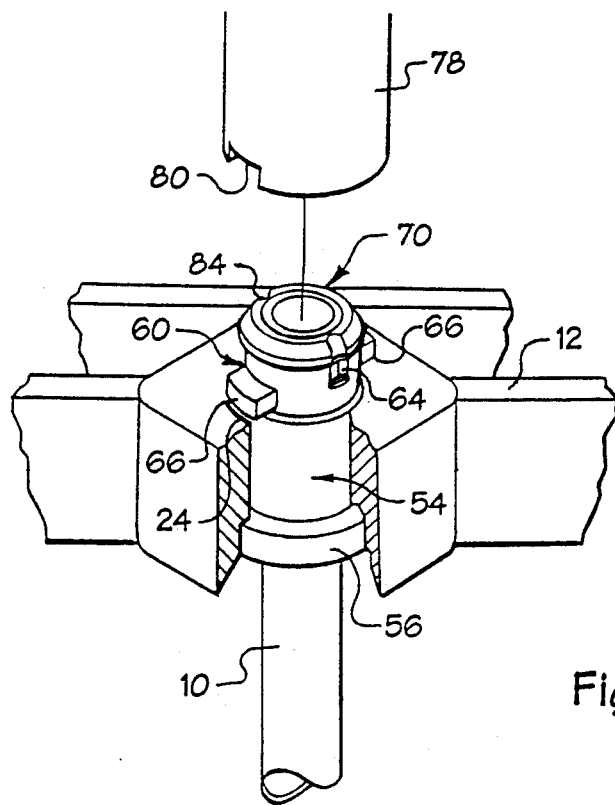
FIG. 7 is a view similar to FIG. 6, but showing the movable locking portion at its aligned or unlocked position.

When it is desired to remove the support plate 12 from the guide tubes 10, a hollow cylindrical tool 78 having notches 80 formed in the bottom edge thereof is passed over the end portion 70 and the rotatable locking portion 60 until the notches 80 receive therein the projections 66, whereupon the tool 78 is rotated to impose a predetermined torsional force on the rotatable locking member 60 which, by virtue of the camming action of the detents 76, causes the spring biased ears 64 to be deflected outwardly and permit rotation of the rotatable locking portion 60 until the spring biased ears 64 reach the other pair of detents 76' and deflect inwardly to resiliently maintain the rotatable locking portion 60 at its unlocked position as shown in FIG. 7.

At this unlocked position, the projections 66 are aligned with the support plate slots 24, and when all of the locking assemblies 52 in the fuel bundle are moved to, and maintained at, their unlocked positions, the support plate 12 can be lifted off of the guide tubes 10 with the slots 24 passing over the aligned projections 66. Again, as was the case with the first embodiment, it will be noted that after the support plate has been removed, all of the locking assemblies 52 remain integrally fixed at the end of the guide tubes 10 without any loose parts, and the rotatable locking members 60 of each locking assembly 52 are maintained in their unlocked position by the spring biased ears 64 so that the support plate can be repositioned on the guide tubes 10 without any movement or adjustment of the locking assembly components.

Figure 8:
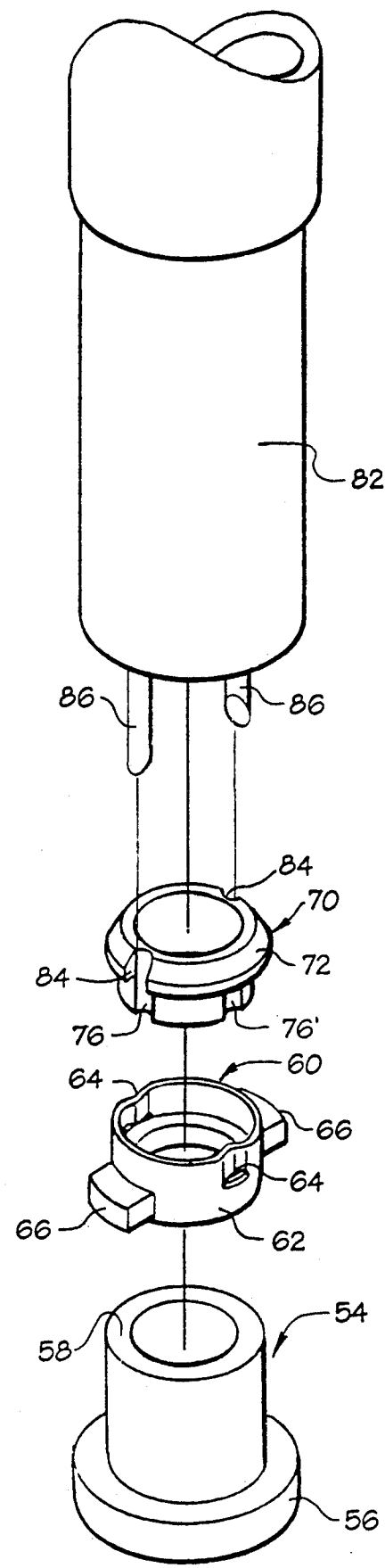
FIG. 8 is an exploded view illustrating a feature of the second embodiment of the present invention by which crimps can be formed in the movable locking portion.

If for some unforeseen reason, use of the second embodiment should result in the spring biased ears 64 losing some of their resiliency through constant expansion and deflection, a further feature of the present invention allows for additional spring biased ears 64 to be crimped into the annular wall 62 using a crimping tool 82 as illustrated in FIG. 8. Even though the shoulder 72 of the fixed end portion 70 extends over the annular wall 62, this shoulder 72 is formed with opposed apertures 84 located directly above one of the pairs of detents 76 and aligned therewith. Accordingly, since the annular wall 62 has a circular configuration as illustrated in FIG. 8, the depending prongs 86 of the crimping tool 82 can be moved downwardly through the apertures 84 in the shoulder 72 and through the aligned detents 76 until the prongs 86 engage and crimp the annular wall 62 to form new spring biased ears 64 therein, all without any necessity of disassembling the locking assembly 52 for this purpose.

Figure 9:
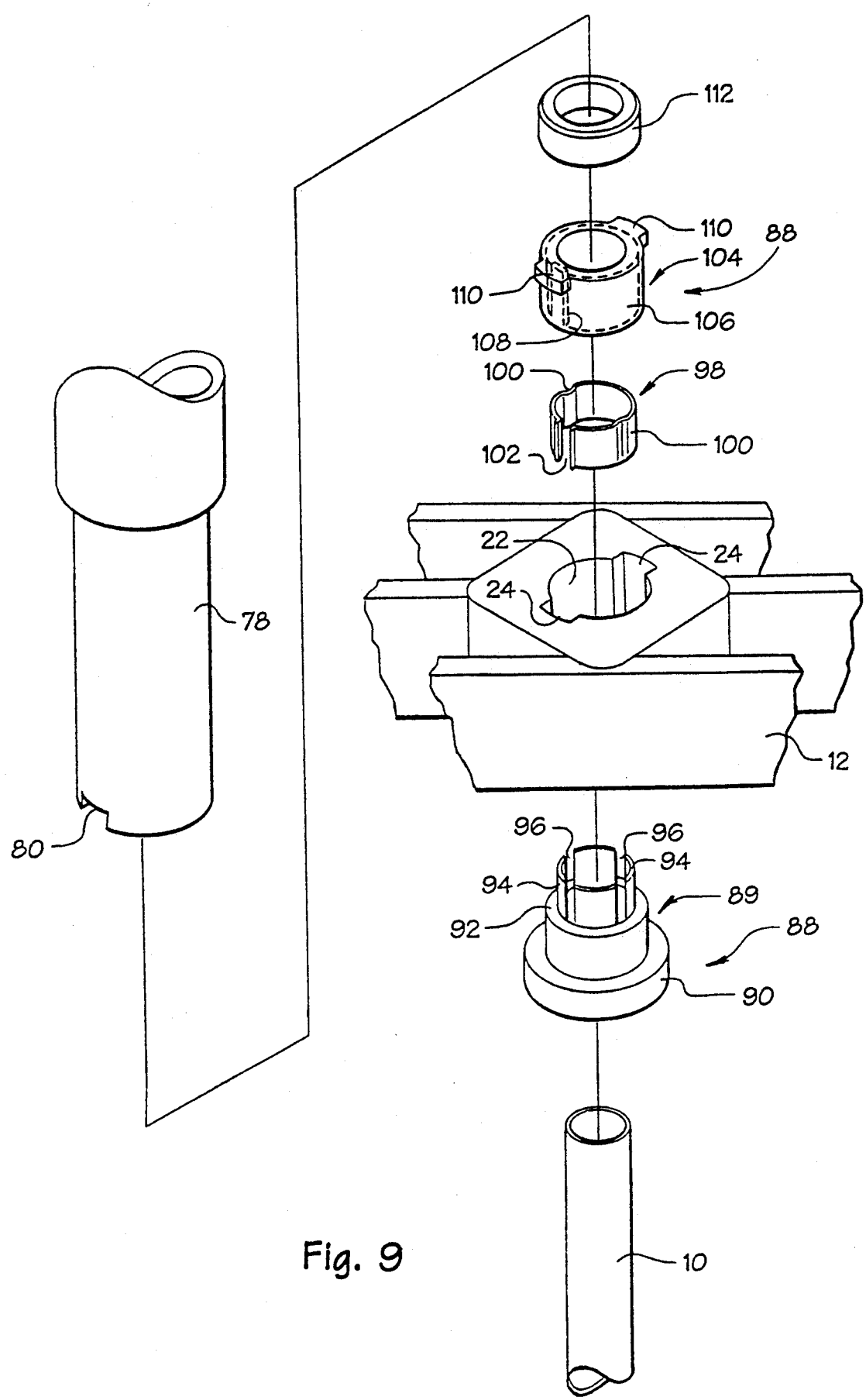
FIG. 9 is an exploded view illustrating the various components of a third embodiment of the present invention.
Figure 10:
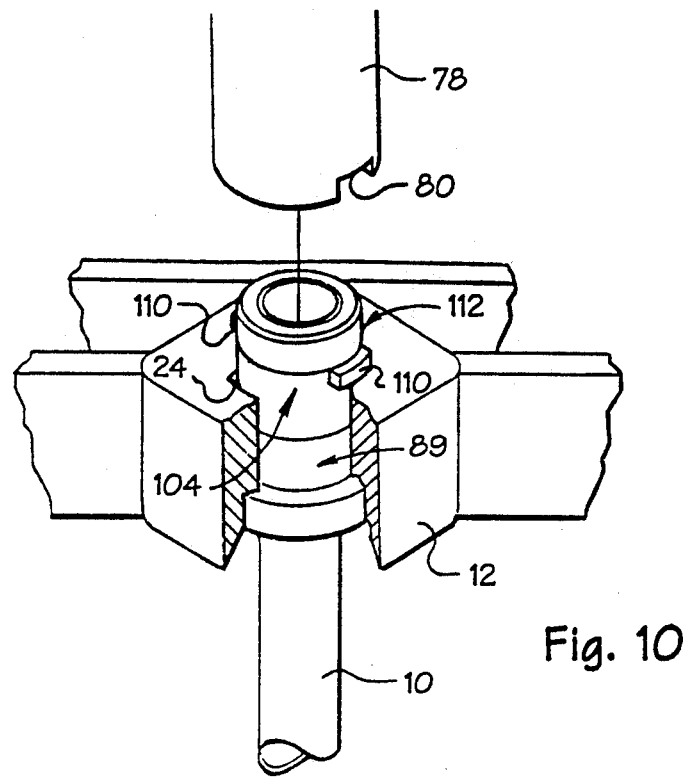
FIG. 10 is a perspective view, partially in section, illustrating the movable locking portion at its locked position.
Figure 11:
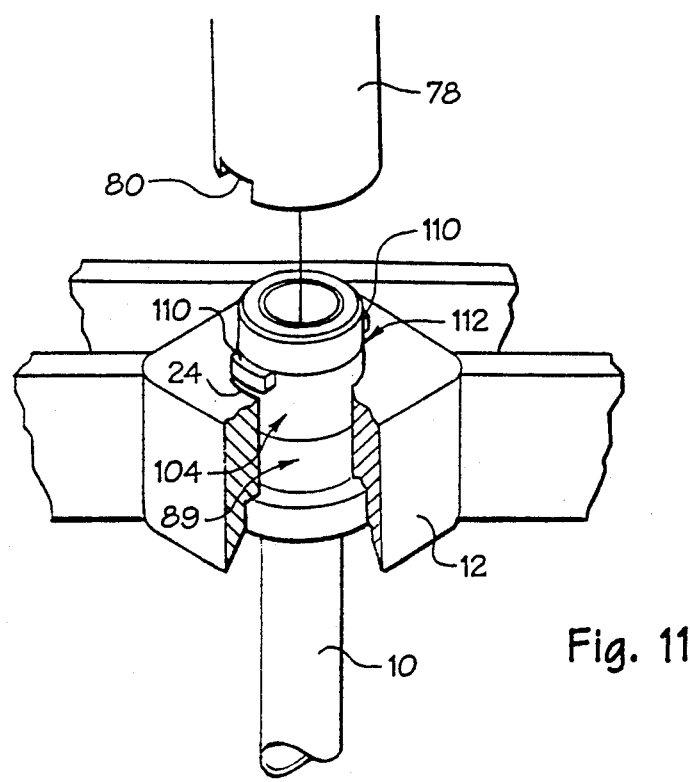
FIG. 11 is a perspective view similar to FIG. 10, but illustrating the movable locking portion at its aligned or unlocked position.

A third embodiment of the present invention is illustrated in FIGS. 9-11 which illustrate a locking assembly 88 that includes a collar 89 that is welded or otherwise secured at the upper end of a guide tube 10, the collar 89 including a shoulder 90 for supporting the support plate 12, a sleeve portion 92 extending upwardly therefrom, and a plurality of curved fingers 94 that project upwardly from the sleeve 92 with spacings 96 between each of the fingers 94. A relatively thin annular snap ring 98, preferably made from a suitable resilient metal, is formed with a pair of opposed spring biased ears 100 and a spacing 102 between its two ends, and the snap ring 98 is positioned over the upstanding fingers 94 to encircle such fingers with the ears 100 being positioned in two of the opposed spacings 96 between the fingers 94. A movable locking member 104 is provided with an annular sleeve portion 106 that is positioned over, and receives therein, the snap ring 98, and the interior annular surface of the sleeve portion is provided with an inwardly directed protrusion 108 that is received within the spacing 102 of the snap ring 98. The rotatable locking member 104 also includes a pair of oppositely disposed projections 110 having a shape corresponding generally to the support plate openings 24, and the locking member 104 is held in place by a fixed end portion 112 that is welded or otherwise secured at the upper end of the guide tube 10 with the rotatable locking member 104 being sandwiched between the fixed end portion 112 and the sleeve 92 so that it is free to rotate, but is held against axial movement, or separation from the other components.

In operation, the rotatable locking member 104 is positioned at its locked position as shown in FIG. 10 with the projections 110 extending over the upper surface of the support plate 12 to lock it in place on the guide tube 10. At this position, the locking member 104 is maintained at its locked position by the spring biased ears 100 resiliently engaging two of the opposed spacings 96 between the fingers 94, and with the snap ring 98 being movable with the rotatable locking member 104 by virtue of the protrusion 108 extending into the snap ring spacing 102.

When it is desired to remove the support plate 12 from the guide tube 10, a tool 78 identical to that described above is positioned over the fixed end piece 112 until the notches 80 receive therein the projections 110, whereupon the tool 78 is rotated to cause the spring biased ears 100 to deflect outwardly and permit rotational movement of the locking member 104 until the spring biased ears 100 resiliently engage the other two opposed spacings 96 between the fingers 94, and the locking member 104 is then positioned at its unlocked position as shown in FIG. 11. At its unlocked position, the projections 110 are openly aligned with the support plate slots 24 and the support plate can then be moved upwardly with the projections 110 passing through the slots 24.

As with the other two embodiments, the rotatable locking member 104 is resiliently maintained at its unlocked position by the spring biased ears 100 so no adjustment is necessary when the support plate is repositioned on the guide tubes 10, and each locking assembly 88 is integrally fixed on the end of the guide tubes 10 with no loose parts.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A locking assembly for permitting the easy removal of fuel rods from a nuclear power reactor fuel bundle, said locking assembly including:
   (a) a plurality of guide tubes extending upwardly from the fuel bundle;
   (b) a support plate removably mounted on said guide tubes to permit removal of said fuel rods when said support plate is removed from said guide tubes, said support plate being formed with an opening and being formed with a slot extending outwardly from said opening;
   (c) a collar assembly mounted at the upper extending end of each said guide tube for permitting selective removal of said support plate from said guide tubes, said collar assembly including a base portion and first and second locking portions mounted on said base portion for movement relative to one another, one of said locking portions having a projection formed thereon corresponding generally in shape to said support plate slot, and one of said locking portions being movable between a first position at which said projection is openly aligned with said slot to permit removal of said support plate and a second position at which said projection is not openly aligned with said slot whereby said plate is locked in place on said guide tubes; and
   (d) resilient means associated with said collar assembly, said resilient means being located on one of said locking portions for resiliently engaging a surface of the collar assembly with sufficient force to maintain said movable locking portion at said second locking position thereof, and for releasing said engaged surface when a predetermined torsional force is applied to said movable locking portion, thereby permitting movement of said movable locking portion to said first aligned position thereof at which said support plate can be removed from said guide tubes.

2. A locking assembly as defined in claim 1 wherein one of said locking portions includes an annular body portion presenting an annular engagement surface, and said resilient means resiliently locks said movable locking portion against movement by engagement at said annular engagement surface.

3. A locking assembly as defined in claim 2 wherein said resilient means includes a detent formed in said annular engagement surface of said movable locking portion, and a spring biased ear resiliently engaging said detent at said second locking position of said movable locking portion and disengaging said detent at said first position of said movable locking portion.

4. A locking assembly as defined in claim 3 wherein said resilient means includes a second detent formed in said annular engagement surface of said movable locking portion, and said spring biased ear engages said second detent at said first position of said movable locking portion.

5. A locking assembly as defined in claim 2 wherein said resilient means includes a fixed annular spring biased element disposed in slidable abutting relation with said annular engagement surface of said movable locking portion.

6. A locking assembly as defined in claim 5 wherein said annular spring biased element receives within its confines said movable locking portion, said annular engagement surface of said movable locking portion includes at least one detent formed therein, and said annular spring biased element includes a spring biased ear for resiliently engaging said detent at said second locking position of said movable locking portion.

7. A locking assembly as defined in claim 2 wherein said annular engagement surface is located at the interior face of said movable locking portion and includes a locking protrusion extending inwardly therefrom, and said resilient means includes a spring biased element received within said movable locking portion and being formed with an opening for receiving said inwardly extending protrusion for causing said spring biased element to move with said movable locking portion.

8. A locking assembly as defined in claim 2 wherein said first locking portion is said movable locking portion and is formed with a spring biased ear in said annular engagement surface, and said second locking portion is received within said first locking portion and is formed with at least one detent resiliently engaged by said spring biased ear at said second locking position of said first locking portion.

9. A locking assembly as defined in claim 2 wherein said first locking portion is said movable locking portion, and said second locking portion is fixed to said base portion and is formed with said projection, with said first locking portion being located intermediate said projection and said support plate and being formed with a second slot corresponding to said slot in said support plate, whereby said support plate can be removed when said first locking portion is moved to said first position at which said slot in said first locking portion is aligned with said slot in said support plate, and whereby said first locking portion can be moved to said second position at which said respective slots are not aligned and said support plate is locked against removal by said first locking portion being disposed between said projection and said support plate.

10. A locking assembly for permitting the easy removal of fuel rods from a nuclear power reactor fuel bundle, said locking assembly including:
   (a) a plurality of guide tubes extending upwardly from the fuel bundle;
   (b) a support plate removably mounted on said guide tubes to permit removal of said fuel rods when said support plate is removed from said guide tubes, said support plate being formed with an opening and being formed with a slot extending outwardly from said opening;
   (c) a collar assembly mounted at said extending end of said guide tube for permitting selective removal of said support plate from said guide tubes, said collar assembly including a base portion, a first locking portion arranged for rotational movement with respect to said base portion and having a body portion formed with a slot which corresponds in shape to said slot in said support plate, and a second locking portion fixed to said base portion and including a projection extending outwardly therefrom, said first locking portion being disposed intermediate said projection and said support plate and being rotatable between a first position at which said slot therein is openly aligned with said slot in said support plate to permit said support plate to pass over said projection for removal, and a second position at which said slot therein is out of alignment with said slot in said support plate and said body portion is disposed between said projection and said support plate to prevent removal of said support plate over said projection; and (d) resilient means for resiliently maintaining said first locking portion at said second position thereof and for permitting movement of said first locking portion to said first position thereof when a predetermined torsional force is applied to said first locking portion.

11. A locking assembly as defined in claim 10 wherein said first locking portion includes an exterior annular engagement surface, and said resilient means also resiliently engages said annular engagement surface at said first position of said first locking portion.

12. A locking assembly as defined in claim 11 wherein said annular engagement surface includes at least two detents located at spaced location therein, and wherein said resilient means includes a spring biased ear resiliently engaging one of said detents when said first locking portion is at said first position thereof and resiliently engaging the other of said detents when said first locking portion is at said second position thereof.

13. A locking assembly as defined in claim 12 wherein said spring biased ear is formed at the interior annular surface of a locking cup member that receives said first locking portion and positions said exterior annular surface thereof adjacent said interior annular surface of said locking cup member.

14. A locking assembly for permitting the easy removal of fuel rods from a nuclear power reactor fuel bundle, said locking assembly including:

(a) a plurality of guide tubes extending upwardly from the fuel bundle;

(b) a support plate removably mounted o said guide tubes to permit removal of said fuel rods when said support plate is removed from said guide tubes, said support plate being formed with an opening and being formed with a slot extending outwardly from said opening;

(c) a collar assembly mounted at said extending end of each said guide tube for permitting selective removal of said support plate from said guide tubes, said collar assembly including a base portion fixed to said guide tube, and a locking portion rotationally mounted o said base portion and including a projection corresponding generally in shape to said slot in said support plate, said locking portion being rotatable between a first position at which said projection is openly aligned with said support plate slot to permit removal of said support plate and a second position at which said projection overlies said support plate to prevent removal thereof, and said locking portion being formed with an interior annular surface; and (d) resilient means associated with said collar assembly for resiliently locking said locking portion against movement when it is at said second position thereof, said resilient means including a spring biased element disposed within and adjacent said interior engagement surface of said locking portion for resiliently engaging said fixed base portion with a sufficient force to normally maintain said locking portion at said first position thereof and for releasing said locking portion when a predetermined torsional force is applied thereto.

15. A locking assembly as defined in claim 14 wherein said annular surface of said locking portion has an inwardly extending protrusion and said spring biased element is a snap ring positioned within said locking portion for rotational movement therewith and formed with indentations for resiliently engaging said fixed base portion.

16. A locking assembly for permitting the easy removal of fuel rods from a nuclear power reactor fuel bundle, said locking assembly including:

(a) a plurality of guide tubes extending upwardly from the fuel bundle;

(b) a support plate removably mounted on said guide tubes to permit removal of said fuel rods when said support plate is removed from said guide tubes, said support plate being formed with an opening and being formed with a slot extending outwardly from said opening;

(c) a collar assembly mounted at the extending end of each said guide tube for permitting selective removal of said support plate from said guide tubes, said collar assembly including a base portion, a movable locking portion rotatably mounted on said base portion and being formed with a projection corresponding generally in shape to said support plate slot, and a retaining member fixed to said guide tube maintaining said movable locking portion in place on said base portion, said movable locking portion being movable between a first position at which said projection is aligned with said support plate slot to permit removal of said support plate and a second position at which said projection overlies said support plate to prevent removal thereof; and (d) resilient means for resiliently maintaining said movable locking portion at said second position thereof and for permitting movement of said movable locking portion to said first position thereof when a predetermined torsional force is applied thereto, said resilient means including cooperating portions of both said movable locking portion and said retaining member.

17. A locking assembly as defined in claim 16 wherein said movable locking member includes an open interior annular wall portion, said retaining member includes an exterior annular wall portion disposed within and adjacent said open interior annular wall portion, and said resilient means includes a detent formed in said exterior annular wall portion and a spring biased ear formed in said interior annular wall portion, whereby said movable locking portion is normally resiliently maintained at said second position thereof when said spring biased ear is within said detent.

18. A locking assembly as defined in claim 17 wherein said interior annular wall of said movable locking portion is formed of deflectable metal and includes an indentation that is normally deflected inwardly to form said spring biased ear and that can be deflected outwardly when said predetermined torsional force is applied to said movable locking portion to move it from said second position to said first position.

19. A locking assembly as defined in claim 18 wherein said retaining member includes a radially projecting shoulder that extends over said interior annular wall portion of said movable locking portion to maintain it in place on said base portion, said shoulder being formed with at least one axial groove positioned therein to permit a tool to be pushed therethrough to form said spring biased ear in said movable locking member.

* * * * *